United States Patent [19]
Dowley et al.

[11] 3,891,943
[45] June 24, 1975

[54] LONG LIFE HELIUM METAL VAPOR LASER

[75] Inventors: Mark W. Dowley, Palo Alto; William A. Shull, Portola Valley, both of Calif.

[73] Assignee: Liconix, Mountain View, Calif.

[22] Filed: Aug. 6, 1974

[21] Appl. No.: 495,222

[52] U.S. Cl. ............ 331/94.5 G; 330/4.3; 313/225; 313/228
[51] Int. Cl. ......................... H01s 3/22; H01s 3/09
[58] Field of Search .................... 331/94.5; 330/4.3; 313/225, 228

[56] References Cited
UNITED STATES PATENTS
3,748,595  7/1973  Rigden ............................ 331/94.5

OTHER PUBLICATIONS
Hernquist, RCA Review, Vol. 34, No. 9, Sept. 1973, pp. 401–407, TK6540 R122.

*Primary Examiner*—Robert J. Webster
*Attorney, Agent, or Firm*—Schatzel & Hamrick

[57] ABSTRACT

A helium metal vapor laser comprising a first tube defining a first bore; a second tube defining a second bore colinear with the first bore with adjacent ends of the first and second tubes forming a narrow opening therebetween; a third tube coaxial with the first and second tubes and having end walls joined to the first and second tubes such that the internal surface of the third tube and the outer surfaces of the enclosed portions of the first and second tubes form a reservoir, the inner diameter of the third tube being greater than the outer diameter of the first and second tubes near said adjacent ends; a coating of metal coated on the internal surface of the third tube away from the bores and the narrow opening; a cathode structure; and an anode structure. The first, second and third tubes form a sealed envelope adapted to receive a supply of helium gas for providing a discharge through the first and second tubes between the anode structure and the cathode structure. The narrow opening is adapted to confine the discharge within the bores so as to inhibit the discharge from being in direct contact with the metal. The end walls and the third tube are adapted to conduct, and the first and second tubes are adapted to radiate and convect heat produced by the discharge to the metal, whereby the metal may be indirectly heated in a manner such that a substantially uniform rate of the metal vaporizes and diffuses through the narrow opening into the first and second bores.

13 Claims, 3 Drawing Figures

PATENTED JUN 24 1975
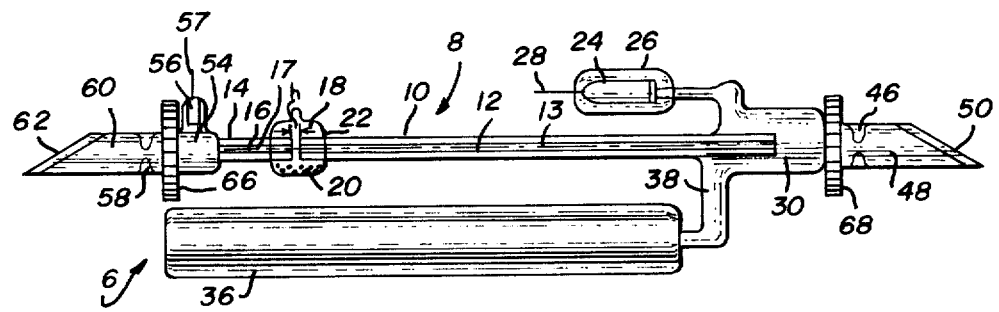
Fig_1
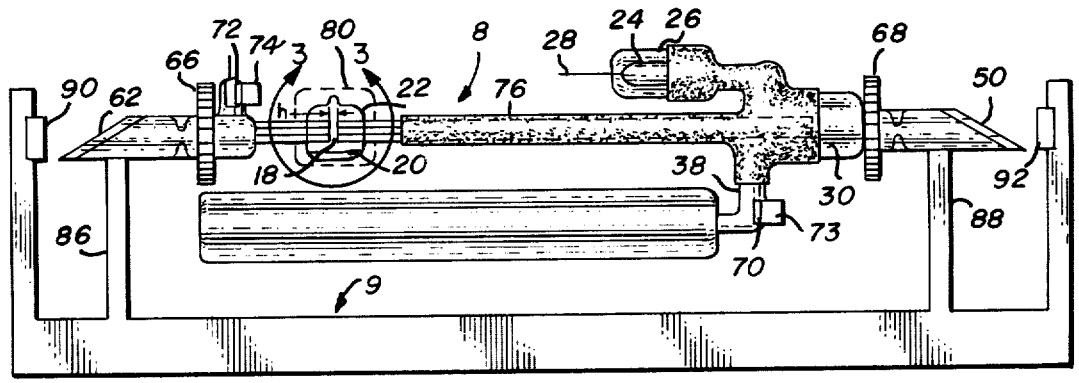
Fig_2
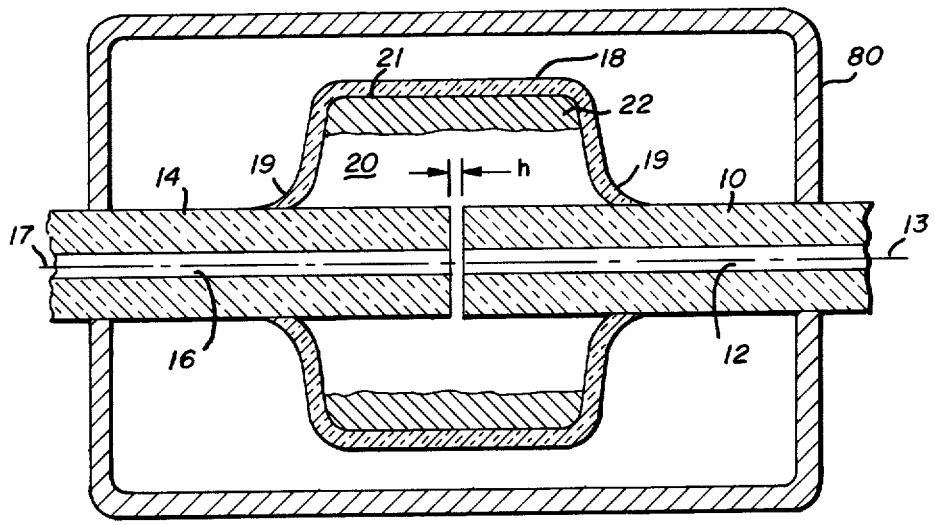
Fig_3

LONG LIFE HELIUM METAL VAPOR LASER

BACKGROUND OF THE INVENTION

1. Field of the Invention

This invention relates generally to metal vapor lasers, and more particularly to helium cadmium and helium selenium lasers that include a metal reservoir which reservoir is indirectly heated by the helium discharge so as to uniformly vaporize the metal.

2. Description of the Prior Art

The state of the prior art relating to helium cadmium lasers, is exemplified by the article "Simplified Low Noise Helium Cadmium Laser with Segmented Bore" by W. T. Silfvast and L. H. Szeto, *Applied Physics Letters*, Vol. 19, No. 10, pgs. 445–447, Nov. 15, 1971. This article describes the use of segmented bores to realize a low noise helium cadmium laser and indicates that when a single cadmium element is used and positioned near the anode, a uniform cadmium density over the entire bore region cannot be obtained through cataphoresis pumping. The article further notes that when instabilities occur near the cadmium source, the instabilities tend to propagate over the entire length of the discharge tube, thereby causing large fluctuations in the output signals of the laser. Based upon these observations, the article recommends using a plurality of cadmium elements segmented throughout the bore so as to overcome the fluctuation problem.

In addition, U.S. Pat. No. 3,755,756 entitled "Gaseous Laser Employing A Segmented Discharge Tube" by W. T. Silfvast, generalizes the specific teachings of the above-described article and describes the use of the segmented bore structure to overcome the disadvantages of a single cadmium source.

Other prior art descriptions of helium cadmium lasers are included in articles entitled "Efficient CW Laser Oscillation at 4416A in Cadmium (II)" by W. T. Silfvast, *Applied Physics Letters*, Vol. 13, No. 5, pps. 169–171, Sept. 1, 1968; "Cataphoresis in the Helium Cadmium Laser Discharge Tube" by T. P. Sosnowski, *Journal of Applied Physics*, Vol. 40, No. 13, pps. 5138–5144, December, 1969; "Discharge Current Noise in Helium Neon Laser and Its Suppression," by Takeo Suzuki, *Japanese Journal of Applied Physics*, Vol. 9, No. 3, March 1970; "Helium Clean-Up in the Helium-Cadmium Laser Discharge" by T. P. Sosnowski and M. B. Klein, *Journal of Quantum Electronics*, Vol. QE-7, No. 8, August 1971, pps. 425–426; and in U.S. Pat. No. 3,624,548, entitled "Discharge Tube Configuration of Metal Vapor Ion Laser" by T. P. Sosnowski; U.S. Pat. No. 3,585,524, entitled "Ion Lasers Employing Gas Mixtures" by W. T. Silfvast; U.S. Pat. No. 3,663,892, entitled "Improvements of a Metal Ion Laser" by M. B. Klein; and U.S. Pat. No. 3,614,658, entitled "Gas Laser Having Means For Maintaining A Uniform Gas Mixture In A DC Discharge" by J. P. Goldsborough.

SUMMARY OF THE PRESENT INVENTION

It is therefore an object of the present invention to provide a long-life helium metal vapor laser that does not require an external heater to heat the metal contained within a reservoir.

Another object of the present invention is to provide a metal vapor laser in which the metal is not heated by direct contact with the discharge.

Still another object of the present invention is to provide a helium metal vapor laser which is relatively simple to fabricate and which prevents the metal vapor from contaminating the optical surfaces of the laser.

Briefly, the present invention is directed toward a helium metal vapor laser. The laser comprises a first tube defining a first bore, a second tube defining a second bore that is colinear with the first bore with adjacent ends of the first and second tubes forming a narrow opening therebetween. A third tube, coaxial with the first and second tubes and having end walls, is joined to the first and second tubes about the opening such that the internal surfaces of the third tube and the outer surfaces of the enclosed portions of the first and second tubes form a reservoir. The inner diameter of the third tube is greater than the outer diameter of the first and second tubes near said adjacent ends. A coating of metal is formed on the internal surface of the third tube away from the bores and the narrow opening. A cathode structure and an anode structure are positioned with the cathode structure, the anode structure, and the first, second and third tubes forming a sealed envelope. The envelope is adapted to receive a supply of helium gas and provide an electric discharge through the first and second tubes between the anode and the cathode with the narrow opening serving to effectively confine the electric discharge within the bores so as to inhibit its direct contact with the metal. The end walls of the third tube serve to conduct, and the first and second tubes serve to radiate and convect heat produced by the discharge to the metal, whereby the metal may be indirectly heated in a manner such that a substantially uniform rate of the metal vaporizes and diffuses through the narrow opening into the first and second bores. A baffle structure is disposed over the reservoir to prevent air currents from causing the temperature of the reservoir to fluctuate. An insulating jacket surrounds the first tube to maintain the bore above the condensation temperature of the metal. In addition, diffusion traps are aligned along the axis of the tube to prevent the metal vapor from contaminating the optical surfaces of the laser, heat sinks enhance cooling near the metal condensing regions, and a gas ballast is included to supply enough helium to overcome the loss mechanisms of wall diffusion, metal deposition entrapment, and metal sputtering entrapment. The metal is preferably cadmium or selenium.

An advantage of the present invention is that it provides for a helium metal vapor laser which has a long life with stable output power.

Another advantage of the present invention is that it provides for a laser which provides for a low noise signal, is simple to fabricate and reliable and rugged.

Other objects and advantages of the present invention will be apparent to those skilled in the art after having read the detailed disclosure which makes reference to the several figures of the drawing.

BRIEF DESCRIPTION OF THE DRAWINGS

FIG. 1 is a side elevational view of an assembled helium metal vapor laser tube formed in accordance with the present invention;

FIG. 2 is a side elevational view of the tube of FIG. 1 mounted in a resonator; and FIG. 3 is a cross-sectional elevational view of the reservoir of the laser tube taken along the lines 3—3 of FIG. 2.

DETAILED DESCRIPTION OF THE PREFERRED EMBODIMENT

Referring now to the drawings and more particularly to FIGS. 1 and 2 thereof, a helium metal vapor laser referred to by the general reference character 6, and formed in accordance with the present invention is illustrated in side elevational views. The laser 6 comprises a unitary evacuated structure, generally designated by the numeral 8 and a resonator 9. The structure 8 is preferably formed of glass and includes a first tube 10 having a thin hollow cylindrical shape so as to define a first bore 12 extending therethrough about an axis 13. A second tube 14, shaped similar to the first tube 10 is disposed in coaxial alignment with the first tube. Tube 14 forms a bore 16 extending therethrough which defines an axis 17 that is colinear with the axis 13 of the first bore 12. The tubes 12 and 14 are arranged such that the adjacent ends of the tubes are spaced close to one another to form a narrow opening $h$, therebetween. Generally the bore 16 is of the same diameter as that of the bore 12. As will be subsequently described, the tube 14 serves as a cataphoretic shield.

Referring to FIG. 3, a third tube 18, having a substantially cylindrical shape, is positioned around the tubes 10 and 14 about the opening $h$. The tube 18 is coaxial with the axes 13 and 17 and has opposing end walls 19 sealed to the outer wall surfaces of the tubes 10 and 14 near the respective adjacent ends of the tubes. Accordingly, the internal surfaces of the tube 18 and the outer surfaces of the enclosed portions of the tubes 10 and 14 form a reservoir 20 defined by an interior surface 21 of the tube 18. As shown, the inner diameter of the tube 18 is greater than the outer diameter of the tubes 10 and 14. A metal coating 22, preferably comprised of cadmium or selenium, is disposed within the reservoir 20 against the surface 21. The coating 22 may be realized by incorporating the process described in the copending patent application, U.S. Ser. No. 494,892 entitled "Process for Manufacturing a Helium Metal Vapor Laser Tube" by William A. Shull and assigned to the assignee of the present application.

As described in the copending application, a supply of cadmium within the reservoir 20 vaporizes when heated to a temperature of about 220°C and is deposited against the internal surface 21. The deposit forms the coating 22 away from the bores 12 and 16 and the narrow opening $h$. During usage of the laser 6, the coating 22 provides for a uniform distribution around the internal surface of the reservoir. The only path for the cadmium vapor to the active bore regions 12 and 16 of the tubes 10 and 14 is through the narrow opening $h$. Consequently, the narrow opening $h$ serves to effectively confine the gaseous discharge to within the bores 12 and 16 so as to inhibit direct contact of the discharge with the cadmium. Moreover, it should be recognized that due to the direct contact between the cadmium and the reservoir, thermal gradients are prevented.

A cathode 24 of a substantially hollow cylindrical shape and enclosed at one end, is positioned within a glass cathode envelope 26. The cathode 24 is preferably of the cold cathode type with an emitting surface of metal oxide formed by the conversion of $BaCO_3$ to $BaO$ and $SrCO_3$ to $SrO$. A cathode terminal 28 in engagement with the cathode 24 extends through the envelope 26 to the exterior to enable connection of the cathode to a high voltage source (not shown). The cathode envelope is supported by a cadmium condenser 30 joined to the cathode envelope 26. The condenser 30 is formed so as to surround the outer end of the tube 10, thereby providing a discharge path through the bore 12 to the cathode 24. A gas ballast 36 is also joined to the cadmium condenser 30 by an interconnecting glass portion 38. The ballast 36 has a hollow cylindrical shape and extends along side the tubes 10 and 14 with its axis substantially parallel to the axis 13. The ballast 36 may be filled with helium gas and is adapted to hold a sufficient quantity to enable the laser to remain operative for a lifetime of over several thousand hours. The outer end of the cadmium condenser 30 is joined to a necked-down portion defining a diffusion trap 46. The internal bore of the diffusion trap 46 is aligned with the axis 13, and has a small diameter to prevent cadmium from passing beyond the outer end of the condenser 30. A window structure 48 including a Brewster window 50 is disposed on the other end of the diffusion trap 46. Alternatively, in internal mirror lasers, the structure 48 may include a reflector (not shown).

An anode structure 54 housing an anode 56, which is preferably fabricated from tungsten material, is joined to the outer end of the tube 14 so as to provide a discharge path from the anode 56 through the bore 16, the cadmium reservoir 18 and into the bore 12. An anode terminal 57 extends through the structure 54 to the anode 56. An opening in the outer end of the anode structure 54 is sealed to a necked-down glass portion that forms a diffusion trap 58. As was the case with the diffusion trap 46, the diameter of the bore of the diffusion trap 58 prevents cadmium vapor from leaving the discharge path and condensing on the critical optical portions of the laser. A second window structure 60 is joined to the outer end of the diffusion trap and terminates with an optical surface 62, such as a Brewster window or an internal reflector. As illustrated in the drawing, the tubes 10 and 14, the reservoir 18, the condenser 30, the diffusion traps 46 and 58 and the window structures 48 and 60 lie along a common axis and are parallel with the axis of the cathode 26 and the ballast 36. Moreover, the entire structure is constructed to form a sealed envelope.

Heat sinks 66 and 68 are mounted around the body of the glass discharge structure with the sink 66 between the diffusion trap 58 and the anode structure 54, and the sink 68 between the diffusion trap 46 and the cadmium condenser 30. Heat sinks 66 and 68 include a plurality of radially-extending fins and serve to enhance cooling of the glass in regions away from the discharge path. Preferably, the heat sinks 66 and 68 are fabricated from metal because of their high thermal conductivity.

During the fabrication of the laser tube, as described in the previously recited Shull application, two magnetic shields 70 and 72 are selectively disposed within the laser tube to prevent cadmium from striking the Brewster windows 50 and 62. After processing, however, the shields serve no useful purpose and must be removed from the optical path. Accordingly, a magnet 73 is disposed against the interconnecting portion 38 so as to magnetically attract and thereby prevent the shield 70 from inadvertently entering the optical path. In addition, a magnet 74 is disposed against the outer surface of the anode structure 54 at a location near the anode 56 so as to maintain the shield 72 out of the optical path of the laser tube.

A heat insulating means, preferably an asbestos jacket 76, is disposed over portions of the tube 10, the cadmium condenser 30, the cathode structure 26 and the interconnecting means 38 to prevent condensation of the cadmium within the discharge path. In particular, the jacket 76 prevents convection currents from contacting, and consequently cooling, the jacketed regions and thus enhances stable lasing operation. As a further precaution against a detrimental cooling effect, a baffle structure 80 is mounted on the tube around the cadmium reservoir 30 to prevent convection currents from striking the reservoir. Accordingly, the baffle 80 protects the reservoir from temperature fluctuations and maintains the outer surface of the reservoir at a substantially constant temperature.

The resonator 9 includes mounts 86 and 88 for securely holding the laser tube. In addition, mirrors 90 and 92 associated with the body of the resonator 9 are aligned relative to the laser tube in a manner well known in the art to provide lasing action of the laser. Alternatively, the mirrors may be internal to the laser.

In operation, a discharge is initiated in the helium gas which fills the glass laser tubes 10 and 14 by the application of a high voltage of about 15K volts between the anode 56 and the cathode terminal 28. Once the helium gas is ignited, a stable discharge results along the discharge path provided from the anode 56, through the anode structure 54, the bore 16, the narrow opening 17, the bore 12, and the cadmium condenser 30 to the cathode 24. The discharge is characterized by a voltage drop of about 1500–1900 volts between the terminals or about 40 volts per centimeter along the discharge path. Since the narrow opening $h$ effectively confines the discharge within the bores, direct contact of the discharge with the cadmium is prevented. Because of the novel construction of the reservoir, the power associated with the voltage drop between the electrodes serves to uniformly and indirectly heat the cadmium 22 by several modes. In the primary mode, heat from the discharge is conducted through the walls of the tubes 10 and 14 and the walls of the tube 18 to the cadmium 22. In secondary modes, heat is radiated and convected from the walls of the portions of the tubes 10 and 14 extending within the reservoir 20 to the exposed surfaces of the cadmium coating 22. In a third mode, heat is transferred by conduction through the helium gas. When the temperature of the cadmium reaches about 220°C the cadmium, which is deposited as a substantially uniform coating on the inner surface of the walls of the reservoir, vaporizes. Due to the low thermal mass of the cadmium and of the surrounding glassware, the reservoir is very quickly brought to the vaporization temperature of the cadmium without the need for an external heater. Since the cadmium coating is at a substantially uniform distance from the axis 13 and 17 of the bores 12 and 16, respectively, an even rate of the cadmium vapor is caused to leave the reservoir 20 and to enter the helium discharge zone within the bores. The baffle structure 80 disposed around the reservoir 20 helps to maintain the outer surface of the reservoir at a constant temperature by protecting the reservoir from fluctuations in air currents. The temperature of the cadmium 22 is well within the working range of most hard glasses and thus poses no serious breakage problem.

Cadmium vapor, when introduced into the helium discharge, easily becomes ionized by both hot electrons and excited helium atoms. The cadmium ions are swiftly drawn toward the cathode end of the bore 12 and consequently a net transport of cadmium takes place from the anode 56 to the cathode 24 by the well-known cataphoretic transport affect. As the cadmium is cataphoretically transferred through the bore 12, the asbestos jacket 76 maintains the tube 10 at a relatively high temperature and prevents plating of the cadmium along the bore of the tube. Consequently, the cadmium is caused to plate against the walls of the cadmium condenser 30 that are not covered with the asbestos jacket 76. The heat sink 68 serves to cool the walls of the condenser 30 which are impacted by the cadmium. The diffusion traps 46 and 58 prevent cadmium from leaking through to the windows 50 and 62, respectively.

In the preferred embodiment the narrow opening $h$ is about 1 millimeter, the bore diameter is 1.5 millimeters, the lasing wavelength is 441.6nm and the gaseous discharge consists of helium gas at approximately 5 Torrs of pressure. In addition, the reservoir 20 has an inner diameter of about 15 millimeters and a length of about 17 millimeters. The cathode 24 is comprised of barium oxide material which has been found to extend the life of the discharge laser tube to well over 2,000 hours. It should be noted that if an adequate gas ballast 36 were not employed, the helium gas might not outlast the supply of cadmium contained in the reservoir 20. About 3 grams of cadmium are initially disposed within the reservoir. However, the reservoir capacity can be readily increased to hold substantially more than 3 grams, thereby yielding a laser tube life that is substantially in excess of 2,000 hours.

With the described construction, a high-power, low-noise helium cadmium laser has been provided which transports cadmium at a rate of about 1.5 grams per 1,000 hours from the anode region to the condenser. Since it is recognized that power failure will result if cadmium vapor is allowed to deposit on any of the critical optical surfaces such as the Brewster windows or the internal mirror surfaces, condensation is prevented at the anode end by the use of a cataphoretic shield and at the cathode by an efficient condenser prior to the critical surfaces associated therewith. The resonator and mirror support structure are preferably fabricated from a low expansion material.

From the above, it will be seen that there has been provided a helium metal vapor laser which fulfills all of the objects and advantages set forth above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A helium metal vapor laser comprising:
   a first tube defining a first bore;
   a second tube disposed along an axis common to said first tube and defining a second bore, adjacent ends of said first and second tubes being closely spaced relative to one another so as to form a narrow opening therebetween;
   a third tube coaxial with said first and second tubes and having end walls which are joined to said first and second tubes such that the internal surface of said third tube and the outer surfaces of the enclosed portions of said first and second tubes form a reservoir, the inner diameter of said third tube being greater than the outer diameter of said first and second tubes near said adjacent ends;

a mass of metal disposed within said reservoir, said metal forming a coating on said internal surface away from said bores and said narrow opening;

a cathode structure coupled to the end of said first tube opposite said narrow opening and including a cathode;

an anode structure coupled to the end of said second tube opposite said narrow opening and including an anode, said cathode structure, said anode structure, and said first, second and third tubes forming a sealed envelope; and helium gas filling said envelope for substaining a discharge through said first and second tubes between said anode and said cathode, said narrow opening serving to effectively confine said discharge within said bores so as to inhibit its direct contact with said metal, said end walls and said third tube serving to conduct discharge produced heat to said metal, and said first and second tubes serving to radiate and convect discharge produced heat to said metal, thereby indirectly heating said metal in a manner such that a substantially uniform rate of the metal vaporizes and diffuses through said narrow opening into said first and second bores.

2. A helium metal vapor laser as recited in claim 1 wherein said third tube is substantially cylindrical.

3. A helium metal vapor laser as recited in claim 1 wherein said narrow opening is smaller than the diameter of said first bore so as to prevent said discharge from contacting said metal.

4. A helium metal vapor laser as recited in claim 1 and further comprising a metal vapor condenser joined to said cathode structure and to said first tube, the inner surfaces of said condenser serving to condense the metal vapor after it is transported through said first bore.

5. A helium metal vapor laser as recited in claim 4 and including a gas ballast joined to said condenser and said first tube for supplying helium gas to said envelope.

6. A helium metal vapor laser as recited in claim 4, comprising a first diffusion trap which is joined to said condenser, and a second diffusion trap which is joined to said anode structure, said first and second diffusion traps having necked down portions which define small diameter bores, said small diameter bores being in alignment with said first and second bores so as to effectively prevent said metal vapor from passing beyond said condenser and said anode structure, respectively.

7. A helium metal vapor laser as recited in claim 6 wherein said laser includes first and second optical window structures connected to said first diffusion trap and said anode structure, respectively, and further comprising a cathode heat sink disposed between said condenser and said first window structure to enhance cooling near the region of condensation, and an anode heat sink disposed between said anode structure and said second window structure to enhance cooling away from the discharge path.

8. A helium metal vapor laser as recited in claim 1 and further including a baffle structure disposed around said reservoir for protecting said reservoir from fluctuations in air currents thereby maintaining a substantially constant temperature on the outer surface of said reservoir.

9. A helium metal vapor laser as recited in claim 4 and further comprising a heat insulating jacket disposed around said first tube and portions of said condenser and said cathode structure serving to prevent condensation of the metal vapor within the discharge path.

10. A helium metal vapor laser as recited in claim 5 and comprising a pair of shields formed of magnetic material, and first and second magnet means, said first magnet means disposed to attract one of said pair of shields against the walls of said anode structure at a region near said anode, and said second magnet means disposed between said gas ballast and said condenser so as to attract the other one of said pair of shields, said first and second magnet means maintaining said shields away from the optical path.

11. A helium metal vapor laser as recited in claim 1 wherein said metal is cadmium and said reservoir comprises about 3 grams of cadmium, each of said grams providing between 500 and 1,000 hours of laser life.

12. A helium metal vapor laser as recited in claim 1 wherein said cathode is a cold cathode comprised of barium oxide and strontium oxide, and said anode is comprised of tungsten material.

13. A helium metal vapor laser as recited in claim 7 and further comprising a resonator including first and second reflectors, said resonator holding said envelope such that said first and second window structures are respectively aligned with said first and second reflectors.

* * * * *

UNITED STATES PATENT OFFICE
CERTIFICATE OF CORRECTION

Patent No. 3,891,943   Dated June 24, 1975

Inventor(s) Mark W. Dowley & William A. Shull

It is certified that error appears in the above-identified patent and that said Letters Patent are hereby corrected as shown below:

Column 7, line 17, change "substaining" to --sustaining--.

Signed and Sealed this seventh Day of October 1975

[SEAL]

Attest:

RUTH C. MASON
Attesting Officer

C. MARSHALL DANN
Commissioner of Patents and Trademarks